Nov. 26, 1963    V. R. CAMPBELL    3,112,127
FLUID PRESSURE TUBE FITTING
Filed June 6, 1960
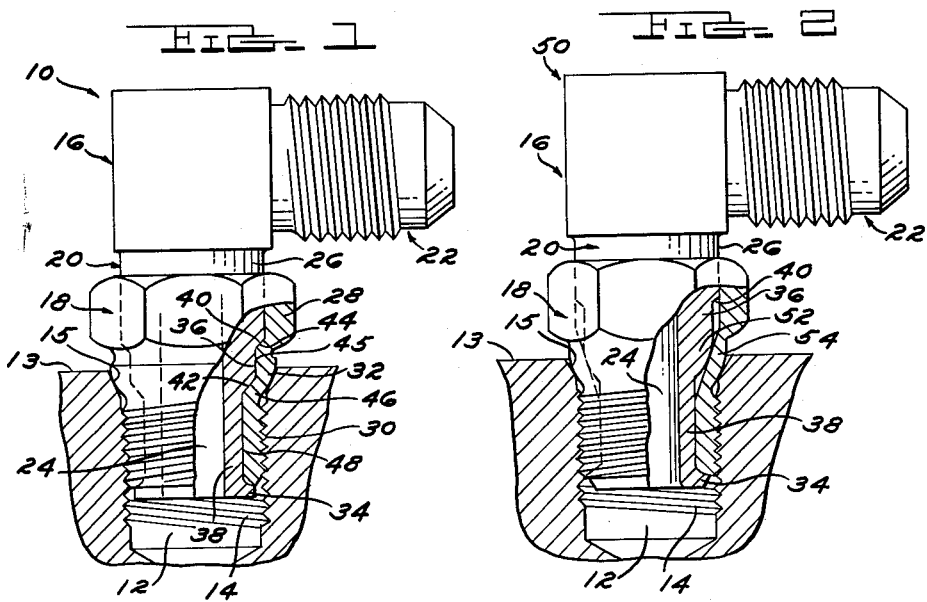
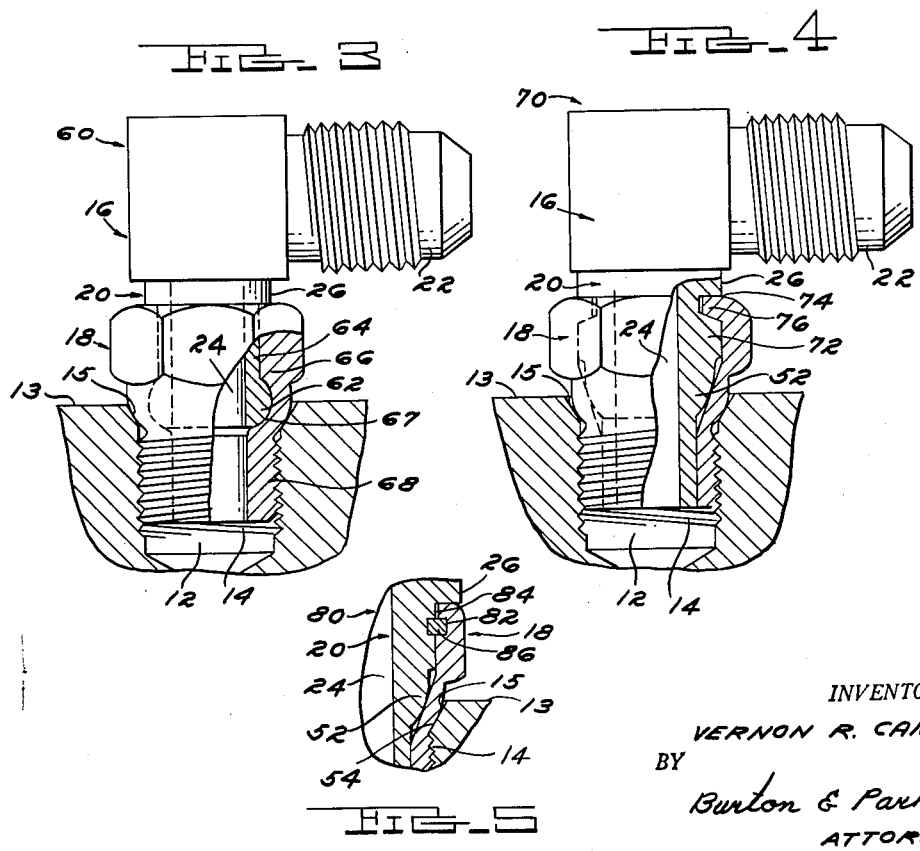
INVENTOR.
VERNON R. CAMPBELL
BY
Burton & Parker
ATTORNEYS United States Patent Office 3,112,127
Patented Nov. 26, 1963

3,112,127
FLUID PRESSURE TUBE FITTING
Vernon R. Campbell, Berkley, Mich., assignor to L & L Manufacturing Company, Warren, Mich., a corporation of Michigan
Filed June 6, 1960, Ser. No. 34,181
10 Claims. (Cl. 285—158)

This invention relates to fluid pressure tube couplings and particularly to screwed transverse couplings or fittings for use in straight threaded ports and wherein a laterally extending fluid pressure conducting portion may be angularly adjusted to any selected position about the axis of the port into which the fitting is connected and while in such adjusted position the fitting may be tightened in fluid pressure sealing communication with the port.

Transverse tube fitting or coupling, as used herein, refers to a tube fitting having a longitudinal flow passageway and a transversely disposed flow passageway in communication therewith and leading to a lateral orifice. Examples of a transverse tube fitting are the elbow, T, cross and lateral tube fittings. A screwed, transverse tube fitting is a transverse tube fitting having a threaded portion for engagement with a corresponding threaded portion of a fluid conductnig element to which the fitting is to be connected, such as the threaded port of a valve or fluid pressure manifold.

A specific object of this invention is to provide a screwed, transverse straight thread fitting in which a laterally extending fluid pressure conducting portion thereof may be adjusted to any desired angular position about the longitudinal axis of the fitting while the fitting is connected to the port but before it is sealingly connected thereto and which fitting, when sealingly connected, will maintain the sealed connection under high pressure fluid use.

Another specific object of this invention is to provide a screwed, transverse tube fitting which has a simple structure with a minimum of parts and which parts are captively connected.

Still another specific object of this invention is to provide a transverse, screwed fitting with structure such that torque applied thereto to screw the fitting into the port and into a sealed connection with the port can be applied to the fitting relatively close to the port and without placing the entire fitting when tightly screwed into the port under a substantially torque stressed condition.

Yet another specific object of this invention is to provide a screwed, transverse tube fitting with all of these features, which can be screwed into a port with conventional tools without the necessity of highly skilled and trained personnel.

In general, this invention involves a tube fitting which comprises a body member having a longitudinal tubular section receivable at one end in a port to which the fitting is to be connected, and a coupling sleeve member rotatably mounted on the tubular section in the region of the port end thereof. The coupling sleeve member has an exterior, threaded surface portion for threaded engagement with a corresponding interior, threaded surface portion of the wall surface defining the port into which the fitting is mounted. The tubular section and the coupling sleeve member comprise cooperative structure for holding the port end of the tubular section in said port. In addition, the tubular section and coupling sleeve member comprise annular contact surfaces for fluid pressure sealing between the tubular section and the coupling sleeve member and between the coupling sleeve member and the wall surface defining the port when the coupling sleeve member is tightly screwed into the port.

These and other concepts of this invention are present in the specific embodiments of this invention illustrated in the drawings. In the drawings:

FIG. 1 is a partially sectioned, side view of one embodiment of a screwed, transverse tube fitting of this invention;

FIG. 2 is a partially sectioned, side view of another embodiment of a screwed, transverse tube fitting of this invention;

FIG. 3 is a partially sectioned, side view of still another embodiment of a screwed, transverse tube fitting of this invention;

FIG. 4 is a partially sectioned side view of yet another embodiment of a screwed, transverse tube fitting of this invention; and FIG. 5 is a sectioned, side view of pertinent portions of the tubular body member and coupling sleeve member in combination with a retaining ring member of still another embodiment of a screwed, transverse tube fitting of this invention.

In FIGS. 1–5 there are shown tube fittings 10 (FIG. 1), 50 (FIG. 2), 60 (FIG. 3), 70 (FIG. 4), and 80 (FIG. 5) mounted in a port 12 in the face 13 of a manifold, valve block, or the like. The port 12, it will be observed, has an interior, cylindrical surface portion 14 which is radially threaded with threads of the straight type. In addition, the entrance to the port 12 is countersunk, providing an annular, outwardly directed, bevel 15.

Each tube fitting 10, 50, 60, 70, and 80 is of the screwed, transverse tube fitting type. Each involves a body member 16 and a coupling sleeve member 18.

In each fitting the body member 16 comprises a longitudinal tubular section 20 and a transverse nozzle section 22. The longitudinal tubular section 20 has a port end and an outer end. The transverse nozzle section 22 which projects laterally from the longitudinal tubular section 20 merges into the longitudinal tubular section 20 in the region of the outer end of the latter. The longitudinal tubular section 20 contains an inner, longitudinal flow passageway 24 which extends longitudinally from an opening at the port end thereof to the region of the outer end thereof whereat it joins an inner, transverse flow passageway (not shown) provided by the transverse nozzle section 22. In the embodiments shown the longitudinal flow passageway 24 longitudinally terminates within the fitting 10 at the transverse flow passageway and does not extend outwardly and longitudinally beyond. Between the transverse nozzle section 22 and the region of the port end, the longitudinal tubular section 20 comprises a longitudinal spacer portion 26. The length of the spacer portion 26, as measured along the longitudinal axis of the tubular section 20, is selected to at least space the transverse nozzle section 22 from the face 13 of the manifold, valve block, and the like, when the fitting is tightly screwed into the port 12. In the region of the port end the exterior of the longitudinal tubular section 20 is adapted to receive and retain the coupling sleeve member 18 rotatably mounted thereon and to present outer, circumferential, contact surfaces which, in combination with inner, circumferential, contact surfaces of the coupling sleeve member form annular fluid seals between the body member 16 and the coupling sleeve member 18.

In each fitting 10, 50, 60, 70, and 80, the coupling sleeve member 18 encircles the longitudinal tubular section 20 of the body member 16 in the region of the port end of the tubular section 20. It, too, has a port end and an outer or head end. The coupling sleeve member 18 at the head end thereof has an outer rim portion or tool-engaging portion 28 which, in plan view, has a polygonal shape, more particularly, a hexagonal shape. The exterior of the coupling sleeve member 18 in the region of the port end thereof is a cylindrical, circumferentially threaded surface portion 30. The threads are of the straight type. Between the threaded surface portion 30 and the outer rim portion 28, the exterior of the coupling sleeve member 18 comprises an annular bulge 32 having a convex surface which, when the fitting in each case is tightly mounted in the port 12, bears against the annular flat surface of bevel 15 at the entrance to the port 12 and forms therewith a pressure fluid seal. The interior of the coupling sleeve member 18 is adapted to encircle the longitudinal tubular section 20 in the port end region thereof and to provide the aforementioned inner, circumferential contact surfaces.

The fittings 10, 50, 60, 70, and 80 differ from one another in the exterior structure of the longitudinal tubular section 20 in the region of the port end thereof and in the interior structure of the coupling sleeve member 18. In each instance, however, the coupling sleeve is captively retained on the tubular section 20 of the fitting.

In the fitting 10 of FIG. 1 the longitudinal tubular section 20 of the body member 16 has at the port end thereof a laterally extending, annular flange 34. Near the port end of the spacer portion 26 the longitudinal tubular section 20 has a first, cylindrical, constricted or indented portion 36. Between the first, cylindrical, constricted portion 36 and the annular flange 34, the longitudinal tubular section 20 has a second, cylindrical, constricted portion 38 of lesser diameter than the diameter of the first constricted portion 36. Between the spacer portion 26 and the first, cylindrical, constricted portion 36 there is a first, annular bevel portion 40. Between the first constricted portion 36 and the second constricted portion 38 there is a second annular bevel portion 42.

In addition, in the fitting 10 of FIG. 1, the port end of the coupling sleeve member 18 slidingly contacts the head end side of the annular flange 34 at the port end of the longitudinal tubular section 20 of the body member 16. At this point it may be observed that the maximum outside diameter of the annular flange 34 is less than the maximum outside diameter at the port end of the coupling sleeve member 18. Furthermore, the annular flange 34 functions to retain the coupling sleeve member 18 on the body member 16 when the fitting 10 is out of the port 12, and to hold the body member 16 in place when the fitting 10 is screwed into the port 12. The interior peripheral surface contour of the coupling sleeve member 18 conforms to the outer peripheral surface contour of the longitudinal tubular section 20 between the annular flange 34 and the spacer portion 26. Thus, the interior of the coupling sleeve member 18 comprises a first, annular, inwardly sloped portion 44 corresponding to the first, annular bevel portion 40, a first, cylindrical, inset portion 45 corresponding to the first, constricted portion 36, a second, annular, inwardly sloped portion 46 corresponding to the second, annular bevel portion 42 and a second, cylindrical inset portion 48 corresponding to the second, constricted portion 38. The first, cylindrical, inset portion 45 and the second, annular, inwardly sloped portion 46, it will be observed, are disposed generally opposite to the external, annular bulge portion 32. The inside diameter of the coupling sleeve member 18 at the head end thereof, it will also be observed, is slightly greater than the outside diameter of the spacer portion 26 at the port end thereof and the head end interior of the coupling sleeve member 18 receives in sliding fit the port end of the spacer portion 26. As a matter of fact, in this embodiment all interior surfaces of the coupling sleeve member are in sliding fit with the longitudinal tubular section 20 when the fitting 10 is out of the port 12 and when the fitting 10 is loosely screwed into the port 12.

In the fitting 50 of FIG. 2 the longitudinal tubular section 20 of the body member 16 has the port end, annular flange 34, the first constricted portion 36, the second constricted portion 38 and the annular bevel 40 between the port end of the spacer portion 26 and the first constricted portion 36. In these respects it is similar to the longitudinal tubular section 20 of the fitting 10 of FIG. 1. However, instead of having a second, annular bevel 42 between the first constricted portion 36 and the second constricted portion 38, as in the case of the fitting 10 of FIG. 1, the longitudinal tubular section 20 in the fitting 50 of FIG. 2 has an exterior, annular, inwardly curved portion 52. In addition, the coupling sleeve member 18 of the fitting 50 of FIG. 2 has an interior annular, inwardly sloped, shoulder portion 54 in place of the first, annular inwardly sloped portion 44, the first, annular, inset portion 45 and the second, annular, shoulder portion 46 of the coupling sleeve member 18 of the fitting 10 of FIG. 1. The annular shoulder portion 54 in the coupling sleeve member 18 of the fitting 50 of FIG. 2, it will be observed, occurs generally oppositely to the exterior, annular bulge 32 of the coupling sleeve member 18 and to the exterior, annular, inwardly curved portion 52 of the longitudinal tubular section 20 of the body member 16. Moreover, the annular, inwardly curved portion 52 of the longitudinal tubular section 20 contacts, and bears annularly and continuously against, the interior, annular shoulder portion 54 of the coupling sleeve member 18. In this embodiment such contact is in the nature of a sliding fit when the fitting 50 is out of the port 12 and when the fitting 50 is loosely mounted in the port 12, as is also the case between the other surface contacts between the longitudinal tubular section 20 and the coupling sleeve member 18 mounted thereon.

In the fitting 60 of FIG. 3 the longitudinal tubular section 20 of the body member 16 has at the port end thereof an annular flange in the shape of a laterally protruding, annular bulge 62. Between the annular bulge 62 and the port end of the spacer portion 26, the exterior surface of the longitudinal tubular section 20 is cylindrical with an outside diameter less than the outside diameter of the spacer portion 26. The coupling sleeve member 18 in this embodiment has an interior, first cylindrical portion 66 from the head end thereof to the region of the port end of the exterior, tool-engaging, rim portion 18, an annular recess 67 generally opposite to the exterior, annular bulge portion 32 and an interior, second cylindrical portion 68 from the annular recess 67 to the port end thereof. The inside diameter of the first cylindrical portion 66 is less than the outside diameter of the spacer portion 26 of the body member 16. However, the inside diameter of this portion of the interior of the coupling sleeve member 18 is sufficiently greater than the outside diameter of the cylindrical portion 64 of the longitudinal tubular section 20 as to enable the same to be disposed in the coupling sleeve member 18 in a sliding fit when the fitting 60 is out of the port 12 and when the fitting 60 is loosely mounted in the port 12. The exterior, annular bulge 62 at the port end of the longitudinal body member 16 is positioned in sliding fit, under the just-mentioned conditions, in the annular recess 67. In this regard, it will be observed that the port end of the longitudinal tubular section 20 is not disposed as far into the port 12 as in the case of the fittings 10 and 50 of FIGS. 1 and 2. The inside diameter of the second, inner cylindrical portion 68 of the coupling sleeve member is substantially equal to the inside diameter of the longitudinal flow passageway 24 at the port end of the longitudinal tubular section 20 of the body member 16.

The fitting 70 of FIG. 4 differs from the fittings 10 and 50 of FIGS. 1 and 2 in that the port end of the longitudinal tubular section 20 of the body member 16 does not have an exterior, annular flange. In this embodiment the longitudinal tubular section 20 at the port end of the spacer portion 26 has an exterior first cylindrical portion 72 with an annular slot 74 therein. The outside diameter of this first cylindrical portion 72 is substantially the same as the outside diameter of the spacer portion 26. However, it may be less as in the case of the fitting 80 of FIG. 5. The port end side of the annular slot 74 in this embodiment has from the foot thereof to the outside a slope towards the port end of the longitudinal tubular section 20. Between the port end of the first cylindrical portion 72 and the port end of the longitudinal tubular section 20 there is provided the recessed, annular, inwardly curved portion 52 and the second constricted portion 38 of the fitting 50 of FIG. 2. The coupling sleeve member 18 of the fitting 70 of FIG. 4 is substantially identical in structure to the coupling sleeve member 18 of the fitting 50 of FIG. 2 except that in the region of the tool-engaging rim portion 28 thereof there is an inwardly extending, annular flange 76 which is disposed in sliding fit when the aforementioned conditions exist in the annular slot 74 of the first cylindrical portion 72 of the longitudinal tubular section 20. The annular flange 76, it will be observed, is thicker whereat it merges into the coupling sleeve member 18 than at the inner end thereof.

The fitting 80 of FIG. 5 is substantially identical in structure to the fitting 70 of FIG. 4 except for certain differences. Thus, the coupling sleeve member 18 does not have the inwardly extending, annular flange 76. Instead, on the inner side thereof at about the same longitudinal position of the annular flange 76 there is an annular slot 82 opposite the annular slot 74 in the longitudinal tubular section. In addition, the annular slot 74 is substantially rectangular in side view. Furthermore, the inside diameter of the coupling sleeve member 18 between the annular slot 82 and the head end thereof is greater than the inside diameter of the cylindrical surface between the annular slot 82 and the annular shoulder 54 of the coupling sleeve member 18, whereby an annular gap 84 is provided between the longitudinal tubular section 20 and the head end of the coupling sleeve member 18. Seated in sliding fit in both of the annular slots 74 and 82 is a retainer ring member 86 which, in this embodiment, is rectangular in cross section. The retainer ring member 86 functions to retain the coupling sleeve member 18 on the longitudinal tubular section 20 of the body member 16 and to hold the body member 16 in position under use conditions. In addition, the retainer ring member 86 functions to transmit longitudinally aligned compression forces from the coupling sleeve member 18 to the port end region of the longitudinal tubular section 20.

To mount the fittings 10, 50, 60, 70, and 80 of FIGS. 1–5 into a port 12, the port end of the coupling sleeve member 18 is inserted into the port 12 and the coupling sleeve member 18 screwed into the port 12 until it is tightly engaged therewith.

Preferably, and especially for high fluid pressure use, the fluid sealing, contact surface portions of the members of each fitting, and particularly the coupling sleeve member, are formed out of a resistingly deformable, slightly resilient, structurally strong material of construction. Hence, when these fittings 10, 50, 60, 70, and 80 are mounted in a port 12 with the coupling sleeve member 18 tightly screwed thereinto, whereby the coupling sleeve member 18 applies longitudinally aligned, static compressive forces to the port end region of the longitudinal tubular section 20, the adjacent surfaces of the members and the port 12 are brought into fluid sealing, continuous annular contact with one another. Moreover, the contacting surfaces of at least the coupling sleeve member 18 are minutely deformed in directions where surface contact does not in the absence of these static forces exist, whereby additional fluid sealing surface contact is obtained. In addition, when the pressure of fluid within the fitting tends to push the body member 16 from the coupling sleeve member 18, because of the static compressive forces involved, the fluid sealing contact surfaces of at least the coupling sleeve member 18 tend to be further deformed in directions where surface contact does not exist, thus tending to increase the area of surface contact and counteracting this high fluid pressure effect on the fitting. This counteracting result is more pronounced in the fittings 50, 60, 70, and 80 of FIGS. 2–5 than in the fitting 10 of FIG. 1.

During the manufacture and assembly of the fittings shown in FIGS. 1 and 2, the flange portions 34 are initially machined or formed so that they extend inwardly toward the axis of the longitudinal tubular sections 20 so that the coupling sleeve members may be slipped over the tubular sections 20. After the sleeves have been slidably received over the tubular sections 20, the flanges 34 are flared outwardly in any suitable fashion so that the sleeves are captively held on the sections 20.

In the manufacture and assembly of the fitting of FIG. 3, the annular bulge 62 is initially formed such that its outside diameter is sufficiently small to allow the coupling sleeve member 18 to be slidingly received thereover to the position substantially corresponding to that shown in FIG. 3. Thereafter the sleeve member 18 is radially expanded within the area of bulge 62 to flare the bulge 62 outwardly and into the annular recess 67 so that upon completion of this operation the parts are in the relative positions shown in FIG. 3. Such radial expansion of the bulge may be accomplished in any suitable fashion such as with a tool being disposed within the tubular section 20 which will radially expand it.

In the manufacture and assembly of the fitting shown in FIG. 4, the coupling sleeve 18 is formed with the annular flange 76 extending generally cylindrically upwardly from the hexagonal portion of the sleeve so that the sleeve may be slidingly received over the tubular section 20. Thereafter the flange 76 is inwardly flared to be received within the complementary recess 74 of the tubular section 20 such that upon completion of the assembly operation the parts are in the relative position substantially corresponding to that shown in FIG. 4.

In the manufacture and assembly of the fitting fragmentarily shown in FIG. 5, the coupling sleeve 18 is formed with the upper end flared outwardly such that the ring 86 may be snapped in place or swaged in place within the complementary annular groove in the tubular section 20. Thereafter the upper end of the coupling sleeve is swaged inwardly such that its interior annular groove embraces the ring 86. Upon completion of such assembly the parts will be in substantially the relative position shown in FIG. 5.

A chief feature of advantage of the transverse tube fitting embodiments shown is that in each case in mounting the fitting in a port, the transverse nozzle section 22 may be held substantially stationary in the position desired while screwing the coupling sleeve member 18 into the port.

A feature of advantage of the tube fittings of this invention is that torque for screwing the fitting into a port can be applied close to the face of the manifold, valve block, and the like, in which the port is located.

Still another feature of advantage of the tube fittings of this invention resides in the minimum number of structural members involved. In this regard the fitting 80 of FIG. 5 has one disadvantage in that it has one more structural member, retainer ring member 86, than the fittings 10, 50, 60, and 70 of FIGS. 1–4. However, the third structural member in this instance is not weighty or massive, and is simple, so that, compared to the fittings heretofore employed, it is an advance.

The tube fittings of this invention present still other advantages in that they are inherently light weight and occupy only a minimum amount of space.

These and other advantages, meritorious features, and embodiments will be obvious to those in the exercise of ordinary skill in the art upon reading the foregoing specification. Thus, it will be realizezd that the body member 16 may comprise more than one transverse nozzle section 22. Moreover, it will be appreciated that the center line of the transverse passageway provided by the transverse nozzle section 22 can be disposed at angles less than and at angles greater than ninety degrees to the longitudinal axis of the body member 16. Furthermore, it will be realized that the concepts of this invention can be applied to a screwed, tube fitting with no transverse nozzle section 22. In such case, the body member 16 has a longitudinally aligned nozzle section at the outer end thereof. Of course, in addition to at least one transverse nozzle section 22, it is contemplated that the body member 16 may also comprise a longitudinal nozzle section.

I claim:

1. A tube fitting for a straight threaded port having an unthreaded beveled entrance comprising: a sleeve externally straight threaded at one end for threading into the port and having a wrench-engaging portion at the opposite end spaced from the threaded end by an intermediate portion having radially outwardly flaring internal and external annular sealing seats disposed in radial opposition to each other and radially opposite the beveled port entrance, said external seat having a portion of greater external diameter than the minimum internal diameter of said beveled port entrance, said sleeve being threadedly received within said port with the external seat abutting the beveled port entrance and sealing the sleeve in the port, a tubular body telescoped into the sleeve and having inner and outer end portions rotatably supported in opposite ends of the sleeve and spaced apart by an intermediate portion having an outwardly flaring annular sealing surface radially opposed to said internal sealing seat of the sleeve, means connecting said sleeve and tubular body against relative axial displacement while allowing relative rotation therebetween, and said intermediate portion of the sleeve being connected to the straight threaded end and to the wrench-engaging portion for radially inward contraction relative to the tubular body as the sleeve is threaded into the port and the external sealing seat of the sleeve is urged against the beveled port entrance to contract the internal sealing seat into fluid tight engagement with the annular sealing surface of the tubular body to form a seal therewith.

2. The invention as defined in claim 1 characterized in that the internal sealing seat of the sleeve and said sealing surface of the tubular body are complementarily beveled and opposed.

3. The invention as defined in claim 1 characterized in that said tubular body is provided at the extremity of its inner end with a radially outwardly flaring portion overlying the extremity of the straight threaded end of the sleeve preventing axial displacement of the tubular body out of the sleeve.

4. The invention as defined in claim 1 characterized in that said tubular body is provided with an external annular groove and said sleeve is provided with a radially opposed complementary groove, and an annular ring is disposed in said grooves locking the sleeve and tubular body against axial displacement.

5. The invention as defined in claim 1 characterized in that said tubular body is provided with an external annular groove and said sleeve is provided with an integral annular radially inwardly projecting lip disposed in said groove locking the sleeve and tubular body against axial displacement.

6. The invention as defined in claim 1 characterized in that said external sealing seat of the sleeve is arcuate and abuts the beveled entrance of the port.

7. The invention as defined in claim 6 characterized in that said sealing surface of the tubular body is arcuate to abut the internal sealing seat of the sleeve.

8. The invention as defined in claim 7 characterized in that said internal sealing seat of the sleeve is a flat beveled surface.

9. A tube fitting for a straight threaded port having an unthreaded beveled entrance comprising: a sleeve externally straight threaded at one end for threading into the port and having a wrench-engaging portion at the opposite end spaced from the threaded end by an intermediate portion having radially outwardly flaring internal and external annular sealing seats disposed in radial opposition to each other and radially opposite the beveled port entrance, said external seat having a portion of greater external diameter than the minimum internal diameter of said beveled port entrance, said sleeve being threadedly received within said port with the external seat abutting the beveled port entrance and sealing the sleeve in the port, a tubular body telescoped into the sleeve and having a cylindrical portion disposed within the wrench-engaging portion of the sleeve and a sealing portion disposed in radial opposition to said internal sealing seat of the sleeve, said sealing portion of the tubular body having an outwardly flared annular sealing surface for abutting in radial opposition the outwardly flared internal sealing seat of the sleeve, means connecting said sleeve and tubular body against relative axial displacement while allowing relative rotation therebetween, and said intermediate portion of the sleeve being connected to the straight threaded end and to the wrench-engaging portion for radially inward contraction relative to the tubular body as the sleeve is threaded into the port and the external sealing seat of the sleeve is urged against the beveled port entrance to contract the internal sealing seat into fluid tight engagement with the annular sealing surface of the tubular body to form a seal therewith.

10. The invention as defined in claim 9 characterized in that said internal sealing seat of the sleeve comprises an annular groove having a depth radially of the sleeve greater than the inside diameter thereof within the wrench-engaging portion and said groove is longitudinally arcuate, and said tubular body at the sealing portion thereof comprises a bulbous rib of greater diameter than the internal diameter of the wrench-engaging portion of the sleeve and longitudinally arcuate to fit the said groove of the sleeve, that portion of the rib facing the wrench-engaging portion of the sleeve cooperating with the opposed surface of the groove to provide said means preventing relative axial displacement of the sleeve and body.

References Cited in the file of this patent

UNITED STATES PATENTS

| | | |
|---|---|---|
| 295,164 | Gumlich | Mar. 18, 1884 |
| 986,678 | Bordo | Mar. 14, 1911 |
| 1,969,142 | McIntyre | Aug. 7, 1934 |
| 2,175,456 | Couty | Oct. 10, 1939 |
| 2,417,350 | Conroy | Mar. 11, 1947 |
| 2,886,355 | Wurzel | May 12, 1959 |
| 2,926,935 | La Marre | Mar. 1, 1960 |

FOREIGN PATENTS

| | | |
|---|---|---|
| 641,125 | Great Britain | Aug. 2, 1950 |